United States Patent [19]

Coules

[11] Patent Number: 4,600,357
[45] Date of Patent: Jul. 15, 1986

[54] GRIPPER FORCE SENSOR/CONTROLLER FOR ROBOTIC ARM

[75] Inventor: Russell G. Coules, St. Joseph, Mich.

[73] Assignee: Heath Company, St. Joseph, Mich.

[21] Appl. No.: 582,200

[22] Filed: Feb. 21, 1984

[51] Int. Cl.⁴ ............................................. B25J 15/02
[52] U.S. Cl. .................................. 414/730; 73/862.34; 294/106; 901/34; 901/38
[58] Field of Search ............................ 414/730, 7, 751; 901/32, 34, 36, 38; 294/86.19, 86.27, 106; 73/862.32, 862.33, 862.34

[56] References Cited

U.S. PATENT DOCUMENTS

| 2,228,032 | 1/1941 | MacGregor et al. | 73/862.34 X |
| 3,202,449 | 8/1965 | Lemelson | 901/39 X |
| 3,370,213 | 2/1968 | Rose | 901/34 X |
| 3,952,880 | 4/1976 | Hill et al. | 414/5 |
| 3,982,419 | 9/1976 | Boys | 73/862.34 X |
| 4,024,959 | 5/1977 | Gruner | 414/751 |
| 4,132,318 | 1/1979 | Wang et al. | 414/739 X |
| 4,149,278 | 4/1979 | Wiker et al. | 901/38 X |
| 4,351,553 | 9/1982 | Rouetta et al. | 414/7 X |

Primary Examiner—Terrance L. Siemens

[57] ABSTRACT

A gripper assembly for a robotic arm includes two opposing elements displaced by means of a worm gear arrangement for grasping an object positioned therebetween. The worm gear is driven by a rotary drive motor with a torsion spring coupling the drive motor shaft to the worm. First and second shaft encoders are respectively mounted to the drive motor shaft and the worm shaft. First and second pairs of optical sensors respectively coupled to the first and second shaft encoders detect the angular speed and displacement of the drive motor shaft and the worm. With the torsion constant of the spring known, the force applied by the gripper assembly which is proportional to the angular displacement of the worm may be accurately determined and controlled. In addition, the size of the object grasped by the gripper assembly may be determined. By comparing these operating parameters with selected values, the gripper assembly may be precisely controlled such as by means of a microcomputer.

17 Claims, 2 Drawing Figures

GRIPPER FORCE SENSOR/CONTROLLER FOR ROBOTIC ARM

BACKGROUND OF THE INVENTION

This invention relates generally to a gripper device such as used in a robotic arm and more particularly provides for improved operation in a robotic arm by detecting and controlling the grasping force of a pick-up hand attached thereto.

Robotics has become an integral part of an ever increasing number of industrial applications. Robotic systems including automatically controlled arm and hand combinations for grasping, manipulating and moving an object are now even available in nonindustrial applications such as in performing ordinary household tasks. The operating capabilities of such systems depend upon the electromechanical complexity of the robotic system itself. For example, the number of degrees of freedom of the robot arm determines the number of control parameters to be generated and regulated.

In general, a robotic hand includes two linearly displaceable, facing elements for engaging an object to be manipulated. The robotic hand may be capable of continuous operation from full open to full closed positions in order to grasp objects of various sizes or it may be limited to an intermediate position so as to accommodate only objects of a predetermined size. In general, limit switches are used for controlling the positions of the grasping element in such applications. In addition, a limit may be imposed upon the grasping force of the hand mechanism to permit the manipulation of objects of various sizes without breakage or damage thereto.

One approach to detecting the magnitude of the grasping force makes use of compressible conductive foam, the resistance of which is a function of the applied pressure. The manner in which the grasping force is controlled, of course, depends upon the environment in which the robotic arm is to be employed, with the aforementioned capability for accommodating objects of various sizes generally representing the more challenging, complicated and expensive robotic control system. An example of such a control unit for an industrial robot can be found in U.S. Pat. No. 4,240,016 to Inaba et al which makes use of a plurality of detectors for detecting the position of a robotic arm in terms of its several degrees of freedom and a single velocity unit which, under the control of a central processing unit, is connected to one of the axis position control units and one of the motors in accordance with an axis selecting instruction read out from the memory. To date, such systems have been overly complicated such that their use has generally been limited to sophisticated industrial applications.

The present invention is intended to overcome the aforementioned limitations of the prior art by providing an inexpensive and flexible arrangement for measuring and controlling the grasping force applied by a gripper device in a robotic arm upon a manipulated object.

OBJECTS OF THE INVENTION

Accordingly, it is an object of the present invention to provide improved control for a robotic arm having a gripping capability.

It is another object of the present invention to control the gripping force of a pick-up hand positioned on a robotic arm.

It is another object of the present invention to provide a digital control means and method for controlling the operation of a robotic arm.

A further object of the present invention is to provide a microcomputer-controlled gripper assembly for a robotic arm.

A still further object of the present invention is to provide a means and method for accurately measuring the grasping force applied by a robotic arm.

BRIEF DESCRIPTION OF THE DRAWINGS

The appended claims set forth those novel features believed characteristic of the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DESCRIPTION OF PREFERRED EMBODIMENT

Figure 1:
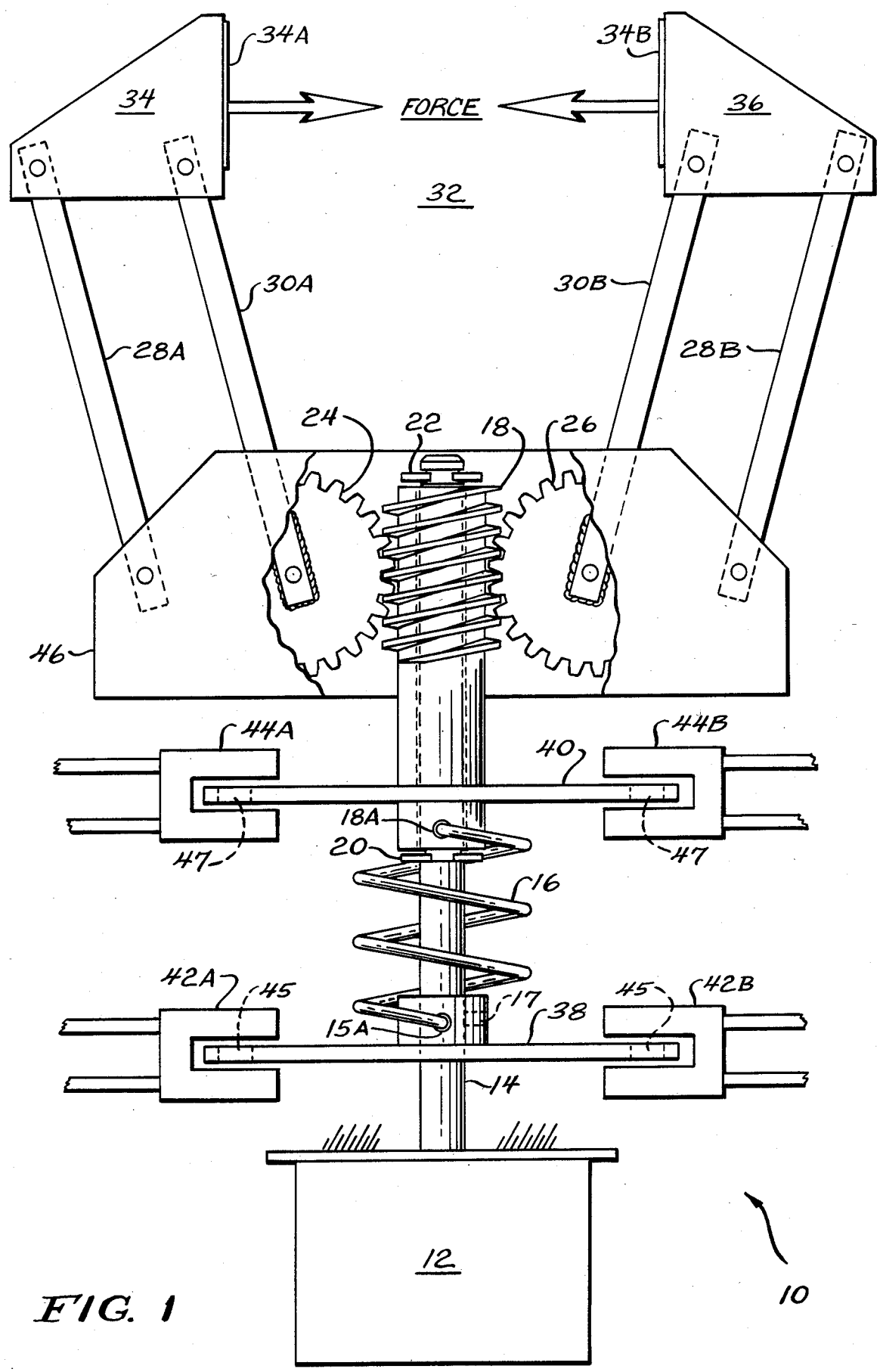
FIG. 1 is a partially cutaway, simplified schematic diagram of a gripper force sensor arrangement for a robotic arm in accordance with the present invention.

Referring to FIG. 1, there is shown a simplified schematic diagram of a robot arm with a gripper force detector 10 in accordance with the present invention.

The robot arm 10 includes a bi-directional drive motor 12 having a rotational drive shaft 14 extending therefrom. Securely positioned upon drive shaft 14 by means of a set screw 17 is a coupling ring 15. Coupling ring 15 includes an aperture 15A in a lateral surface thereof for engaging and retaining one end of a torsion spring 16. The other end of torsion spring 16 is positioned within an aperture 18A in a lateral surface of a threaded shaft, or worm, 18. Worm 18 is loosely positioned upon a distal end portion of the drive shaft 14 and is capable of rotating freely and independently of drive shaft 14. Worm 18 is maintained in position upon drive shaft 14 by means of inner and outer retaining rings 20, 22 positioned immediately adjacent on either side of worm 18.

Worm 18 and drive shaft 14 are therefore rotationally coupled by means of torsion spring 16. The threaded portion of worm 18 engages first and second worm gears 24, 26 which, in turn, are each coupled to a respective inner arm 30A, 30B. The combinations of inner arms 30A, 30B and first and second worm gears 24, 26 coupled thereto as well as a pair of outer arms 28A, 28B are positioned within and mounted to a housing 46. Each of the inner and outer arms is free to pivot with respect to housing 46. The distal portions of adjacent pairs of inner and outer arms 30A, 28A and 30B, 28B are respectively coupled in a pivoting manner to first and second engaging elements 34, 36. Rotation of worm 18 causes rotation of first and second worm gears 24, 26 in opposite directions resulting in the angular displacement of inner arms 30A and 30B. This, in turn, results in the linear displacement of first and second engaging elemente 34, 36, which are displaced either toward or away from each other in response to rotation of worm 18. First and second engaging elements 34, 36 in combination with inner and outer arms 30A, 28A and 30B, 28B form a gripper assembly 32. Displacement of first and second engaging elements 34, 36 toward each other permits an object (not shown) placed between these elements to be engaged by the respective facing surfaces 34A, 34B of the first and second engaging elements 34, 36 in a grasping manner. Rotation of worm 18 in the opposite direction causes the engaging elements to be displaced away from each other resulting in the release of an object positioned therebetween and engaged by facing surfaces 34A, 34B.

Securely positioned upon drive shaft 14 is a first shaft encoder 38 so as to rotate therewith. Similarly, a second shaft encoder 40 is securely positioned upon and rotates with the shaft of worm 18. The first and second shaft encoders 38, 40 respectively include a plurality of apertures, or slots, 45, 47 therethrough. Positioned immediately adjacent the first shaft encoder 38 are a pair of first optical sensors 42A, 42B. Similarly, positioned immediately adjacent the second shaft encoder 40 are a pair of second optical sensors 44A, 44B. Each optical sensor includes a light source and a light detector in order to generate and detect a light beam transmitted through an aperture in a shaft encoder in detecting rotation of a respective shaft encoder. Each optical sensor may, for example, include a light emitting diode (LED) in combination with a phototransistor for detecting transmission of light through one of the apertures within a shaft encoder. A single optical sensor permits detection of the rotation and angular displacement of a shaft encoder, while a pair of optical sensors permits the direction of rotation of a shaft encoder to be determined. Rotation of a shaft encoder will cause a series of light pulses to be detected by an optical sensor which, in turn, provides a series of electrical pulses which may be processed for deriving the differential angular displacement between the shaft encoders and thereby the applied gripper force as described below.

Figure 2:
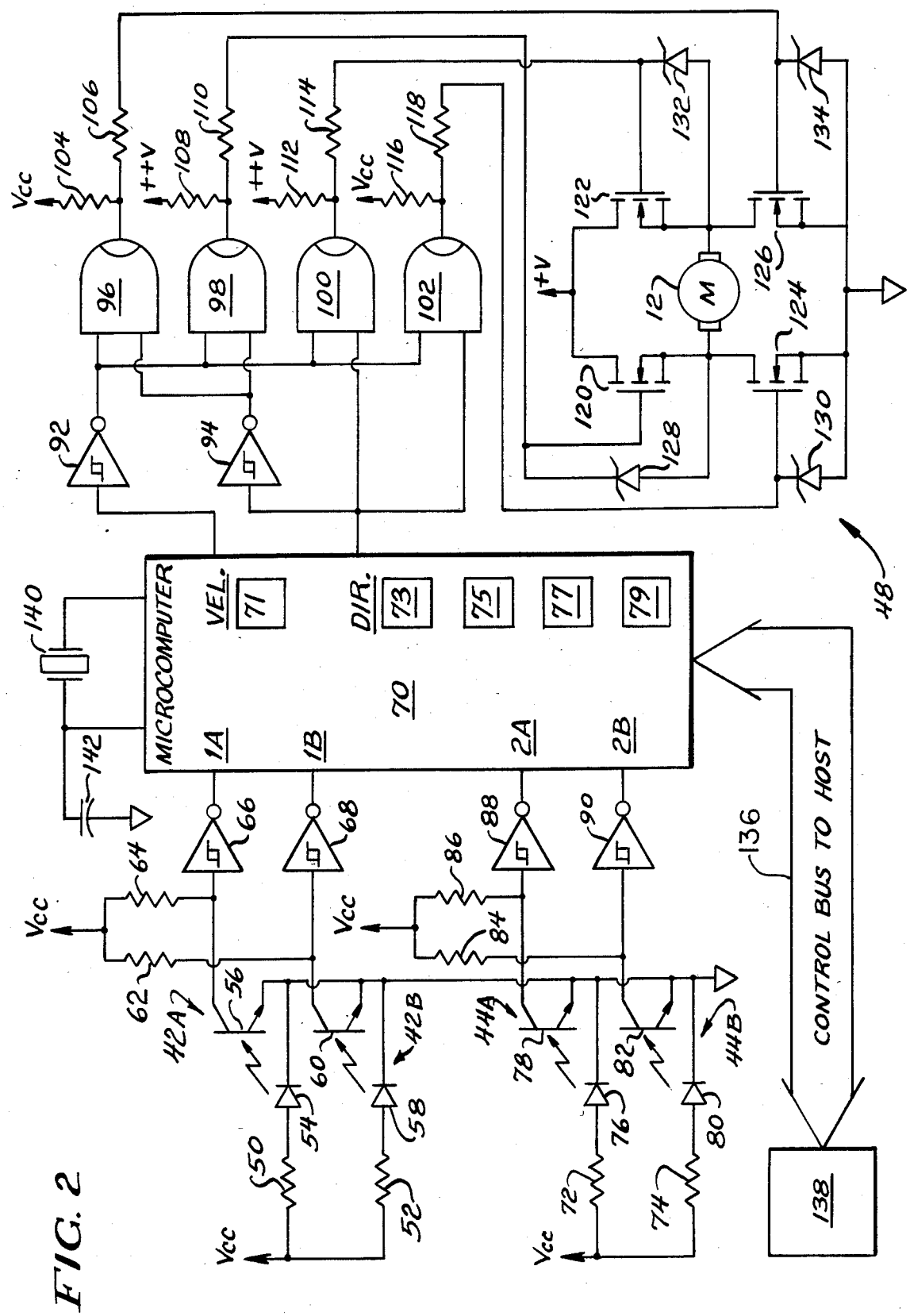
FIG. 2 is a combination schematic and block diagram of a control system for use in controlling the robotic arm of FIG. 1.

Referring to FIG. 2, there is shown in simplified block and schematic diagram form a gripper force detection and control circuit 48 for use in the present invention. Controller circuit 48 includes a first pair of optical sensors 42A, 42B which are respectively comprised of LED's 54, 58 and phototransistors, 56, 60. The first pair of optical sensors 42A, 42B are positioned adjacent the first shaft encoder 38 as shown in FIG. 1 for detecting rotation of motor shaft 14.

A second pair of optical sensors 44A, 44B are positioned adjacent the second shaft encoder 40 for detecting angular displacement of worm 18. The second pair of optical sensors 44A, 44B are respectively each comprised of the combination of a LED 76, 80 and a phototransistor, 78, 82. The first pair of optical sensors 42A, 42B are coupled to a $V_{cc}$ voltage source by means of pull-up resistors 50, 52. Similarly, the second pair of optical sensors 44A, 44B are coupled to the $V_{cc}$ voltage source by means of pull-up resistors 72, 74. When light is not received by a phototransistor, the respective pull-up resistor coupled thereto causes an output of $V_{cc}$ to be provided to a respective inverter circuit coupled thereto. For example, When phototransistor 56 fails to receive a light signal from LED 54 such as when shaft encoder 38 is nonrotating, a high input is provided from phototransistor 56 to inverter 66. With a light signal received by phototransistor 56 from LED 54, the input to inverter 66 is pulled down to ground potential. Optopair 42A is 90° out of phase with optopair 42B. Similarly, optopair 44A is 90° out of phase relative to optopair 44B. Therefore, a positive or negative transition of the output of phototransistor 56 or phototransistor 78 will occur when the output of phototransistor 60 or phototransistor 82, respectively, is either high or low, and from this information the direction of rotation of a corresponding shaft encoder may be determined.

Inverters 66, 68, 88 and 90 are coupled to the $V_{cc}$ source via pull-up resistors 64, 62, 86 and 84, respectively. Therefore, when light is incident upon a phototransistor, it is rendered conductive and provides a 0 input to the inverter circuit coupled thereto which operates as a Schmitt trigger buffer circuit with a tight threshold and high gain to provide a well-defined square wave output in response to a 0 input from its associated photodiode. The outputs from inverters 66 and 68 are respectively provided to the 1A and 1B input pins of microcomputer 70, while the outputs of inverters 88 and 90 are respectively provided to the 2A and 2B input pins of microcomputer 70. It is in this manner that information regarding the rotational direction and angular displacement of the first and second shaft encoders 38, 40 are provided to microcomputer 70 for processing therein.

Therefore, two inputs from the first shaft encoder 38 are provided to the 1A and 1B input pins of microcomputer 70. Similarly, two inputs are provided from the second shaft encoder 40 to the 2A and 2B input pins of microcomputer 70. These two pairs of inputs allow microcomputer 70 to determine the angular speed and direction of rotation of each of the shaft encoders. Channels 1A and 2A are used to change the input pulse count to microcomputer 70 in response to a change in the angular position of a respective shaft encoder. Channels 1B and 2B are used to determine the direction of rotation of a respective shaft encoder. This is possible because respective paired channels, i.e., 1A, 1B and 2A, 2B, are 90° out of phase as previously described.

Microcomputer 70 is conventional in design and includes various components including, for example, a program memory (ROM) 75, a data memory (RAM) 73, a central processing unit (CPU) 71, various timers 77, and a count register 79. These components of microcomputer 70, and others not mentioned herein but which are standard in conventional microcomputer, are used in a conventional manner in carrying out the present invention and thus are not discussed in detail herein. In a preferred embodiment of the present invention, the 8041 Universal Peripheral Interface (UPI) microcomputer available from Intel Corporation of Santa Clara, Calif. is utilized.

Timing is provided to microcomputer 70 by means of an external crystal 140 coupled to neutral ground via capacitor 142. Microcomputer 70 is coupled via a control bus 136 to a host computer 138 and thus may operate as a peripheral device in a larger computer-controlled system. Control bus 136 in a typical system would include a bidirectional data bus, an input address bus, and input read line, an input write line, and a chip select input line decoded from the address bus. Thus, commands from the host computer 138 may be provided via control bus 136 to microcomputer 70 in a conventional manner for controlling the operation of the robot arm with the gripper force detector of FIG. 1.

Microcomputer 70 receives angular speed, displacement, and direction information relative to drive shaft 14 and worm 18 via its 1A, 1B and 2A, 2B input pins, respectively. Input commands from the host microcomputer 38 may be provided to microcomputer 70 via control bus 136 for controlling the operation of the engaging elements 34, 36. This may be accomplished by providing a predetermined angular displacement value to microcomputer 70 from host computer 138 via control bus 136 and comparing this predetermined angular displacement with the difference between the angular displacements of the drive shaft 14 and worm 18. Since the angular displacement of the worm 18 is proportional to the force applied by the first and second engaging elements 34, 36 upon an object positioned therebetween and with the torsional constant of torsion spring 16 known, the force applied by gripper assembly 32 may be determined in terms of the angular displacement of motor shaft 14. By comparing the actual angular displacement of motor shaft 14 with a predetermined value provided from host computer 38 within microcomputer 70, the gripping force of the gripper assembly 32 may be precisely controlled.

This may be expressed by the following equations. The difference in angular displacement between drive shaft 14 and worm 18 may be expressed as:

$$\text{PULSES RECEIVED (1A,1B)} - \text{PULSES RECEIVED (2A,2B)} = \theta_{MOTOR} - \theta_{WORM} \quad (1)$$

$\theta_{MOTOR}$ and $\theta_{WORM}$ respectively represent the angular displacements of the drive shaft 14 and worm 18. Thus, the number of pulses received by a given photodiode within a predetermined time period will provide an angular displacement value for each of the aforementioned shafts. Similarly, the force applied by the gripper assembly 32 may be expressed as:

$$\text{FORCE} = K(\theta_{MOTOR} - \theta_{WORM}) \quad (2)$$

where K is the torsion constant of spring 16. Therefore, the force applied by the gripper assembly 32 may be determined and controlled by providing the appropriate control input to microcomputer 70 via control bus 136 from a host computer 138.

Two outputs are provided from microcomputer 70 in response to the sensed and control inputs provided thereto. These outputs are (1) the velocity corresponding to a predetermined gripper assembly applied force and (2) a predetermined direction of rotation of drive shaft 14 in order to provide the desired engaging force. The velocity output is provided via inverter 92 to one input of each of AND gates 96, 98, 100 and 102. Direction information is provided directly from microcomputer 70 to one input of each of AND gates 100 and 102. In addition, the directional output information from microcomputer 70 is provided via inverter 94 to one input of AND gates 96 and 98. A desired increase in the force applied by gripper assembly 32 will cause AND gates 96 and 98 to conduct, while a desired decrease in the applied force will cause AND gates 100 and 102 to conduct.

The outputs of AND gates 96, 98, 100 and 102 are respectively provided to complementary metal-oxide-semiconductor (MOS) field effect transistors (FET's) 126, 120, 122 and 124. Each of AND gates 96, 98, 100 and 102 are of the open collector type, with the outputs thereof respectively coupled via pull-up resistors 104, 108, 112 and 116 to a ++V voltage source. This arrangement insures that each of the gates of the respective (FET's is pulled higher than its corresponding source.

With a control input provided to a respective gate of each of the FET's, a +V voltage source is coupled across the parallel arrangement of FET's 120, 124 and 122, 126 to neutral ground, where +V<++V. Motor 12 is, in turn, coupled across the parallel arrangements of serially coupled FET's 120, 124 and 122, 126. Zener diodes 128, 130, 132 and 134 are respectively coupled across the source and gate of FET's 120, 124, 122 and 126 for providing static discharge protection for these sensitive devices.

With outputs provided by AND gates 96 and 98 representing a first direction of rotation of drive shaft 14 corresponding to an increase in applied pressure by gripper assembly 32, FET's 120 and 126 will be rendered conductive with a +V voltage applied across motor 12. Similarly, outputs from AND gates 100 and 102 will render FET's 122 and 124 conductive causing a voltage in the opposite direction to be applied across motor 12 resulting in rotation of drive shaft 14 in an opposite direction and a decrease in grasping force applied by gripper assembly 32. It is in this manner that the rotation of motor 12 is controlled so as to cause drive shaft 14 and worm 18 to rotate in the desired direction in either increasing or decreasing the grasping force applied by gripper assembly 32.

In summary, feedback control data is used in the gripper force detection and control circuit 48 in the following manner. The speed at which the engaging elements 34, 36 are displaced is derived from the second shaft encoder 40. The position of the engaging elements 34, 36 is similarly derived from the second shaft encoder 40. The size of the grasped object is derived from the first shaft encoder 38, while the gripper force is derived by the differential of first and second shaft encoders 38, 40 as previously described.

Control of the speed of motor 12 is provided in the following manner. The duty cycle of the velocity (VEL) output of microcomputer 70 is proportional to the output of the count register 79 in the microcomputer. When controlling the speed of motor 12, count register 79 is incremented at a frequency proportional to a selected speed as provided to microcomputer 70 from the host computer 138. Count register 79 will similarly be decremented by gripper device positioning information as provided by the second shaft encoder 40. When the gripper device 32 is controlled in accordance with a selected force, the count register is incremented until the desired displacement differential between the first and second shaft encoders is realized.

There has thus been shown a grasping force controller for a gripper assembly in a robotic arm by means of which the engaging force of the gripper assembly may be accurately measured and controlled. A pair of shaft-mounted optical encoders coupled by means of a torsion spring permit the applied gripper force to be determined, while a programmable controller provides for accurate control of the engaging force applied by the gripper assembly.

While particular embodiments of the present invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. In a robotic arm, apparatus for measuring the gripping force applied by said arm upon an object grasped therein, said apparatus comprising:

drive means having a rotating shaft;

flexible coupling means connected to said rotating shaft;

rotary displacement means positioned upon and supported by said rotating shaft and freely rotatable with respect to said rotating shaft, said rotary displacement further connected to said flexible coupling means so as to rotate in response to displacement of said rotating shaft;

gripper means coupled to said rotary displacement means and responsive to rotation thereof for engaging an object in a grasping manner; and sensor means coupled to said rotating shaft and to said rotary displacement means for measuring the difference between their respective angular displacements for deriving the force applied by said gripper means upon said object and for measuring an increase in the gripping force when said rotating shaft is displaced in a first direction of rotation and a decrease in the gripping force when said rotating shaft is displaced in a second direction of rotation.

2. Apparatus as in claim 1 wherein said rotary displacement means includes a worm gear.

3. Apparatus as in claim 1 wherein said flexible coupling means includes a torsion spring connected at a first end to said rotating shaft and at a second end to said rotary displacement means.

4. Apparatus as in claim 1 wherein said gripper means includes first and second linearly displaceable engaging element having respective facing surfaces between which said object is grasped.

5. Apparatus as in claim 4 wherein said gripper means further includes first and second arms pivotally coupled to respective engaging elements and to said rotary displacement means.

6. Apparatus as in claim 1 wherein said sensor means includes first and second optical sensors respectively coupled to said rotating shaft and to said rotary displacement means for measuring the angular speed, displacement and direction of rotation thereof.

7. Apparatus as in claim 6 wherein each of said first and second optical sensors includes a shaft encoder in combination with light emitting and detecting means for detecting angular displacement.

8. Apparatus as in claim 7 wherein each of said light emitting means includes a pair of light emitting diodes and phototransistors 90° out of electrical phase for determining the direction of angular displacement.

9. A controller for controlling the grasping force exerted upon an object by a gripper device, said controller comprising:

a drive motor having a bi-directional rotary drive shaft mounted thereto;

rotary displacement means coupled to said gripper device for effecting the continuous movement of said gripper device from a fully open position to a fully closed position when said rotary displacement means is rotated in a first direction and for effecting the continuous movement of said gripper device from a fully closed position to a fully open position when said rotary displacement means is rotated in a second direction, and wherein an object is grasped when said gripper device is moved in the direction of said fully closed position, said rotary displacement means positioned upon and supported by said rotary drive shaft and freely rotatable with respect thereto;

flexible coupling means for connecting said rotary drive shaft to said rotary displacement means whereby said gripper device is responsive to operation of said drive motor and for permitting said rotary drive shaft and said rotary displacement means to rotate at different angular velocities in said first and second directions of rotation;

sensor means coupled to said rotary drive shaft and to said rotary displacement means for measuring the difference between their respective angular displacements for determining the force applied by said gripper device upon an object positioned therein and for measuring an increase in the grasping force when said rotary drive shaft is rotationally displaced in said first direction and a decrease in the grasping force when said rotary drive shaft is rotationally displaced in said second direction; and control means coupled to said drive motor and to said sensor means for controlling the force applied by said gripper device upon said object.

10. A controller in accordance with claim 9 wherein said rotary displacement means includes a worm gear.

11. A controller in accordance with claim 10 wherein said gripper device includes linearly displaceable first and second engaging elements each coupled to said worm gear by means of a respective pair of pivotally displaceable arms.

12. A controller in accordance with claim 9 wherein said flexible coupling means includes a torsion spring coupled at a first end thereof to said rotary displacement means and at a second end thereof to the rotary drive shaft of said drive motor.

13. A controller in accordance with claim 9 wherein said sensor means includes first and second optical sensors respectively coupled to said rotary drive shaft and to said rotary displacement means for measuring the angular speed, displacement and direction of rotation thereof.

14. A controller in accordance with claim 13 wherein each of said first and second optical sensor includes a shaft encoder in combination with light emitting and detecting means.

15. A controller in accordance with claim 14 wherein each of said light emitting means includes a pair of light emitting diodes 90° out of electrical phase for determining the direction of angular rotation.

16. A controller as in claim 9 further including input means coupled to said control means for providing predetermined operating parameters thereto in regulating the operation of said gripper device in accordance therewith.

17. A controller as in claim 9 wherein said control means includes a microcomputer.

* * * * *